United States Patent
Melnik

(10) Patent No.: US 9,477,087 B2
(45) Date of Patent: Oct. 25, 2016

(54) HOLOFORM 3D PROJECTION DISPLAY

(71) Applicant: 3DIcon Corporation, Tulsa, OK (US)

(72) Inventor: George Melnik, Montrose, NY (US)

(73) Assignee: 3DIcon Corporation, Tulsa, OK (US)

(*) Notice: Subject to any disclaimer, the term of this patent is extended or adjusted under 35 U.S.C. 154(b) by 334 days.

(21) Appl. No.: 14/204,889

(22) Filed: Mar. 11, 2014

(65) Prior Publication Data

US 2014/0268062 A1 Sep. 18, 2014

Related U.S. Application Data

(60) Provisional application No. 61/778,297, filed on Mar. 12, 2013.

(51) Int. Cl.
*G02B 27/22* (2006.01)
*H04N 13/04* (2006.01)
*G02B 5/32* (2006.01)

(52) U.S. Cl.
CPC ............. *G02B 27/2214* (2013.01); *G02B 5/32* (2013.01); *G02B 27/2264* (2013.01); *H04N 13/0427* (2013.01); *H04N 13/0445* (2013.01); *H04N 13/0459* (2013.01)

(58) Field of Classification Search
CPC ............. H04N 9/3155; H04N 9/3166; H04N 9/3197; G03B 21/14; G03B 21/2013
USPC .......... 353/7, 30, 31, 37, 38, 99, 102; 349/5, 349/7–9, 62
See application file for complete search history.

(56) References Cited

U.S. PATENT DOCUMENTS

| | | | |
|---|---|---|---|
| 3,566,021 A | 2/1971 | Jakes, Jr. | |
| 3,856,986 A | 12/1974 | Macovski | |
| 4,799,739 A | 1/1989 | Newswanger | |
| 4,853,769 A | 8/1989 | Kollin | |
| 5,172,251 A | 12/1992 | Benton et al. | |
| 5,379,133 A | 1/1995 | Kirk | |
| 5,614,941 A | 3/1997 | Hines | |
| 5,801,761 A | 9/1998 | Tibor | |
| 5,993,003 A | 11/1999 | McLaughlin | |
| 6,057,878 A | 5/2000 | Ogiwara et al. | |
| 6,201,565 B1 | 3/2001 | Balogh | |
| 6,224,214 B1 | 5/2001 | Martin et al. | |
| 6,481,846 B1 | 11/2002 | Mikysa | |
| 6,595,644 B2 | 7/2003 | Kostrzewski et al. | |
| 6,665,100 B1 | 12/2003 | Klug et al. | |
| 6,999,071 B2 * | 2/2006 | Balogh | 345/419 |
| 7,084,841 B2 | 8/2006 | Balogh | |
| 7,425,040 B1 | 9/2008 | Honma | |
| 7,440,158 B2 | 10/2008 | Giles et al. | |
| 7,513,623 B2 | 4/2009 | Thomas | |

(Continued)

OTHER PUBLICATIONS

Xinxing Xia et al., Large-scale Color Omnidirectional-view Three-dimensional Display Based on Projector Array, pp. 214-216, SID 2012 Digest.

*Primary Examiner* — Sultan Chowdhury
(74) *Attorney, Agent, or Firm* — Blakely, Sokoloff, Taylor & Zafman LLP

(57) ABSTRACT

A 3D projection apparatus comprises a projector, and an angular array of illumination optics coupled to an imager in the projector to create a plurality of views for an 3D image. An array of projection optics is coupled to the imager and a light source is coupled to the angular array of projection optics.

10 Claims, 6 Drawing Sheets

(56) References Cited

U.S. PATENT DOCUMENTS

| | | |
|---|---|---|
| 7,959,294 B2 | 6/2011 | Balogh |
| 8,075,138 B2 | 12/2011 | Thomas |
| 2003/0169405 A1* | 9/2003 | Agostinelli et al. ............. 353/7 |
| 2009/0160757 A1* | 6/2009 | Robinson ..................... 345/102 |
| 2012/0038693 A1* | 2/2012 | Kang .................. H04N 9/3117 |
| | | 345/691 |
| 2012/0062991 A1* | 3/2012 | Krijn et al. .................... 359/463 |
| 2012/0188516 A1* | 7/2012 | Kashiwagi ............. G02B 7/006 |
| | | 353/31 |
| 2014/0035959 A1* | 2/2014 | Lapstun ....................... 345/690 |

* cited by examiner

HOLOFORM 3D PROJECTION DISPLAY

This application claims the benefit of U.S. Provisional Patent Application No. 61/778,297 filed on Mar. 12, 2013; this application claims the benefit of the provisional's filing date under 35 U.S.C. §119(e), which provisional application is hereby incorporated herein by reference in its entirety.

FIELD

Embodiments as described herein relate to three-dimensional ("3D") display systems, and more particularly, to holoform 3D display systems.

BACKGROUND

Existing glasses-free flat panel 3D displays are based on technologies developed in the early 1900s (e.g., lenticular lens and parallax barrier). These displays have poor image quality and limited 3D capabilities. The current glasses-free flat panel 3D displays present a limited number different views (e.g., 5-9) of an image over a limited horizontal field-of-view (e.g., 20 degrees). When viewed within the ideal viewing range one sees two adjacent views simultaneously (one in each eye) which creates the 3D effect. Outside of this field of view the sets of views repeat (e.g., 1-2-3-4-5-1-2-3-4-5-1-2-3-4-5-1-2-3-4-5) which causes an uncomfortable transition zone when users see view 1 with one eye and view 5 with the other eye. This limited number of views prevents users from getting a full 160-180 degree 3D view of a scene and the transition zones and other visual artifacts (cross talk and moiré) make these displays unacceptable in most applications.

Generally, holography, and in particular electro-holography (moving images) have the potential to present a true 3D image from a flat screen display. Multiple user holographic displays do not exist today due to high pixel count, high bandwidth and high compute power requirements.

Existing holoform rear and front projection displays use a static holographic projection screen and a large number of individual projectors to create a 3D viewing experience. This is achieved by creating a hologram in only the horizontal direction while filling in the vertical plane by diffusion similar in performance to a standard projection screen. This one-dimensional hologram significantly reduces bandwidth requirements and can be achieved with computer power available today.

Existing holoform systems most often use a large number of individual projectors that make them large, noisy, power hungry and very expensive. As a result, the existing holoform systems are not commercially viable. Time multiplexing of a set of projectors in the existing holoform system typically requires a motor-driven image scanning system which results in additional artifacts (e.g., low luminance and blur). These time multiplexed holoform systems require laser illumination which introduces speckle in the image, and may provide safety concerns. The image quality in the existing time multiplexed holoform systems is low. Additionally, many exhibit reliability problems in addition to poor image quality.

Holoform generally refers to a horizontal parallax only 3D technology to direct different image information to each eye. In a holoform 3D system, a special directional scattering screen is used to limit where a viewer can see the appropriate image information. In a holoform 3D system, the holographic screen is typically horizontally segmented (vertically striped) with limited horizontal diffusion in each segment and high diffusion in the vertical direction. Thus light passing through each screen segment can be considered to pass unaffected along a horizontal axis while it behaves as a normal projection screen in the vertical direction. A projector illuminating this screen can effectively be considered a point source that contains image information. If only one projector were employed to illuminate such a screen any viewer would see only a single vertical stripe of the projected image (which is potentially different for each eye) where the vertical information (color and intensity) of the image at that horizontal position on the screen can be seen unaffected. A second projector will create a second stripe and when a sufficient number of projectors are employed in a horizontal arrangement a whole image will be seen over the entire screen that varies in each eye as well as every different viewing position in front of the screen. A small horizontal diffusion is added to each screen segment to improve horizontal uniformity and limit the number of projectors required to illuminate a full image on the entire screen.

Typically, when the image is different in each eye, 3D is perceived. This image information can come from the same projector or a different projector depending on the arrangement. Vertical stripes of image information are presented by each imager to fill the light field, for example, a viewing space. The field of view, for example, a horizontal angular limit where an image is visible, is typically controlled by the number of projectors, the magnification of each projection lens, and in some cases, the angular distribution of the image information. With a large angular distribution, image information can be presented over nearly 180° field of view. Such a large field of view will be required to work in any tiling application such as a video wall application.

In an existing holoform system a reasonably large number of independent projectors are typically used to illuminate the holoform screen. The existing systems remain costly because of the relatively large number of projectors that is required to illuminate a screen even with only a limited field of view.

One way to reduce cost is to time multiplex a smaller number of projectors to create the large number of images that would have been created by the individual projection systems. Existing time multiplexed holoform systems have moving optical elements, such as a scanning or rotating mirror or prism which can deflect each image to a different viewing zone. For these systems, a significant amount of time is required to actually move the mirror and to stabilize the mirror before a new image is projected onto it. This further limits the time light is projected and therefore the brightness of the image. Rotating the mirror or prism in a continuous fashion to eliminate the delay in projecting the new image causes the image to move across the screen as it is projected. This effectively blurs the image resulting in reduced contrast and resolution, and creates substantial 3D crosstalk because at least a portion of each image stripe crosses a stripe boundary as formed on the screen.

SUMMARY

Embodiments of apparatuses and methods to provide a holoform 3D projection display are described. In one embodiment, a 3D projection apparatus comprises an image forming element, for example, a reflective DLP micromirror device or liquid crystal on silicon (LCOS) imager, coupled to an angular array of illumination optics to create a plurality of views for an image. Furthermore, an array of projection optics is coupled to each of the illumination optics array sources, where each of the projection optics array elements is provided an image by the same image forming element.

In one embodiment, a holoform 3D projection display system comprises a plurality of illuminators and an angular array of light guides coupled to the plurality of illuminators. An image forming device is coupled to the angular array of light guides and an array of projection lenses is coupled to the each of the illuminators. In one embodiment, the plurality of illuminators comprises at least one of a light emitting diode or a laser diode. In one embodiment, a mirror arrangement is coupled to the array of projection lenses to increase a field of view of the image.

In one embodiment, light is supplied at a plurality of angles to the image forming device to create an image using an angular array of illumination optics. The supplied light is time multiplexed. The light is directed by the image forming element to an array of lenses. In one embodiment, the lenses have an arrangement determined by the plurality of angles which enables them to collect light from each individual set of illumination optics.

In one embodiment, a transmissive image forming element is used to form the image in each individual angular light path as provided by the illuminator, light guide, and projection lens arranged in an array.

Other features and advantages of embodiments will be apparent from the accompanying drawings and from the detailed description that follows below.

BRIEF DESCRIPTION OF DRAWINGS

The present invention is illustrated by way of example and not limitation in the figures of the accompanying drawings, in which like references indicate similar elements, in which.

DETAILED DESCRIPTION

Figure 1:
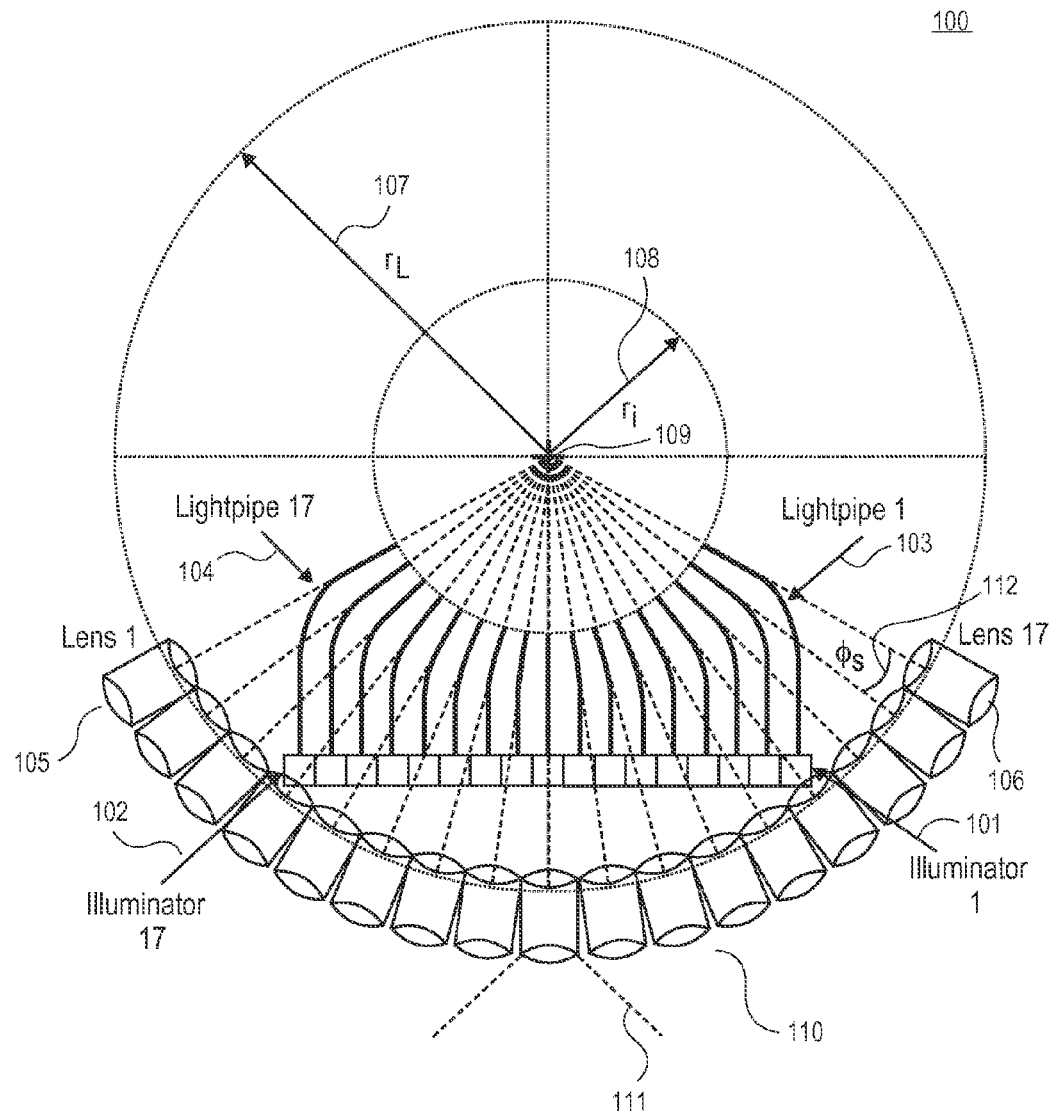
FIG. 1 shows a schematic representation of a top view of an exemplary embodiment of a holoform light engine.

The embodiments will be described with references to numerous details set forth below, and the accompanying drawings. The following description and drawings are illustrative of the embodiments and are not to be construed as limiting. Numerous specific details are described to provide a thorough understanding of the embodiments as described herein. However, in certain instances, well known or conventional details are not described in order to not unnecessarily obscure the embodiments in detail.

Reference throughout the specification to "at least some embodiments", "another embodiment", or "an embodiment" means that a particular feature, structure, or characteristic described in connection with the embodiment is included in at least some embodiments as described herein. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Embodiments of apparatuses and methods to provide a holoform 3D projection display are described. In one embodiment, a 3D projection apparatus comprises an image forming element coupled to an angular array of illumination optics to create a plurality of views for an image. An array of projection optics is coupled to the image forming element. An illuminator is coupled to the angular array of illumination optics.

In one embodiment, a fundamentally new type of time multiplexed holoform 3D display comprises a single projector and an angular array of illuminating light pipes to create a large number of views required. The time multiplexed holoform 3D display as described herein has no moving parts and as result has better performance and reliability. In one embodiment, the time multiplexed holoform 3D display is designed to use a light emitting diode ("LED") illumination to eliminate the speckle and eye safety issues associated with lasers.

A light engine that is the core of the time multiplexed holoform 3D display meets or exceeds image quality objectives. In one embodiment, the light engine includes a digital light projection ("DLP")-based imager with electronics and software, an LED illuminator, a multiple light pipe assembly with a corresponding field lens array, and holoform projection screen.

Advantage of Angular Distribution

A holoform 3D system as described herein has an advantage of no moving parts and therefore no associated delays or resolution loss (e.g., blurring) which can come from scanning images over a surface. Each light engine is capable of creating multiple full color images directed at different angles onto a holoform screen such that a high resolution 3D image can be perceived by multiple viewers in different viewing positions over a wide angle of view. For higher resolutions at least two of these light engines can be combined to double the number of imaging systems with a substantially lower cost to a large image field of view.

FIG. 1 shows a schematic representation of a top view 100 of an exemplary embodiment of a holoform light engine 110. The engine 110 includes at least one light source. In one embodiment, the light source includes illuminators such as a illuminator 101 ("Illuminator 1") and an illuminator 102 ("Illuminator 17") that include at least one light source. An angular array of light guides including e.g., a light guide 103 ("Lightpipe 1") and a light guide 104 ("Lightpipe 17") coupled to the corresponding light source. An image forming element 109 is coupled to the angular array of light guides. An array of projection lenses including e.g., lens 105 ("Lens 1") and lens 106 ("Lens 17") is coupled to the projector 109. In one embodiment, projector 109 represents a DLP imager. In one embodiment, the guides, such as guide 103 and 104 represent optical fibers. In one embodiment, the image forming element is one of the DLP imagers produced by Texas Instruments Inc., ("TI") headquartered at Dallas, Tex., United States.

Typically, in DLP projectors, an image is created by microscopically small microelectromechanical ("MEMS") mirrors (e.g., laid out in a matrix on a semiconductor chip, known as a Digital Micromirror Device (DMD). Each mirror represents one or more pixels in the projected image. These mirrors can be repositioned rapidly to reflect light supplied by an illuminating source to create a gray scale with each sequential Red/Green/Blue illumination as known to one of ordinary skill in the art of DLP light projectors.

In one embodiment, a key to the 3D holoform system disclosed herein is an illumination system. Instead of using scanning optics to direct each view to the proper projection angle an array of illuminating light guides are used to define each view. A single DLP imager 109 is sequentially illuminated by each fiber as shown in FIG. 1. The mirrors of the DLP direct the light from those pixels necessary for the image to the appropriate projection lens, such as lens 105 and 106, arrayed horizontally and defined by the illumination fiber angle. The mirrors of the DLP direct the light from dark pixels away from this array of lenses. As shown in FIG. 1, the alignment of the lens and appropriate illuminating fiber also creates the angle which directs illumination into a specific set of viewing zones from each lens.

A clear advantage of the system described herein is that no moving optics are employed and therefore the delays associated with them are omitted. Light can be generated in any illuminator nearly instantaneously for rendering into any of the views. In one embodiment, each illuminator includes at least one light emitting diode directing illumination into each view and optics for focusing this light into each light pipe. These optics also directs this illumination into the light guide (e.g., optical fiber) with appropriate angular extent (numerical aperture). The fiber effectively conserves the angular extent of the light from the illuminator to the point of emission where this light illuminates the imager. The light is directed by the imager into the appropriate projection lens with the appropriate image information. In one embodiment, the light can be directed into the light pipe to allow expansion onto the imager or remain effectively collimated. This can be controlled by at least one of the illumination source, optics, and shape of the light pipe.

The geometry of the system facilitates its operation. As shown in FIG. 1, a radius of illumination $r_i$ 108 and a radius of an angular lens arrangement $r_L$ 107 are defined by the angular extent of the illumination and angular space occupied by each view, as well as the imager, lens, and illumination fiber dimensions. As with most holoform systems, the best functionality comes with the largest number of views using the smallest possible angular resolution. These parameters further affect the brightness and system complexity. In a manufacturable system a rigid skeleton would be designed to hold all components in their appropriate positions. The components could be interchangeable for various systems as defined by their intended use.

In an embodiment where more angular resolution is desired, two systems are combined, one inverted above the other, and offset by half the angular view space of each lens. In such a case one illuminator is used to illuminate 2 fibers, one in each system because two separate imagers direct appropriate information to the same screen. In an embodiment, where information between views is not substantially different, a single illuminator illuminates multiple views in the same system. This may not be desirable in a fully functional system where any information may be desired for display at any time, but may be applicable to some applications such as video walls where fixed, or busy patterns are desired.

In an embodiment, the illuminator contains at least one red, one green, and one blue light source (e.g., LED, laser diode) for a full color image. In an embodiment, both color and gray scale are controlled by time multiplexing of the illumination and power applied to the light source. Theoretically the current used to drive a LED or laser diode in each illuminator is the continuous power specified by the manufacturer multiplied by the fraction of the frame in which it is used. If each system employs a reasonably large number of views the instantaneous power can be made very high in order to conserve brightness. In practice this may not be as large as the theoretical limit.

The use of LEDs can reduce cost and eliminate the speckle at a cost in a system complexity and image intensity as each subprojector should be designed with a "large" angular field of view. The laser diode can reduce system design limitations because the numerical aperture of the illumination is near zero. Given the tradeoff between these two types of illumination some compromise can be found where speckle is significantly reduced by reducing the numerical aperture of the LED without substantially limiting the image intensity.

FIG. 1 shows a system defining 17 subprojectors. This is not a limitation of the system. More subprojectors can be added, or fewer used, depending on the fundamental optical parameters of the system. To this point, the output of each of these subprojectors, such as output 111 has been loosely referred to as a view. A "view" is actually a 2D image of anything taken at a specific angle and orientation.

In a holoform system the images projected by each of the subprojectors are vertical segments of the views assembled together such that an image is perceived over the entire screen at any eye location in the viewing space. These vertical segments are defined by the screen, the field of view and magnification of each projection lens, the resolution of the imager, as well as the orientation of the projection lens. It is possible that the 17 projector subsystems actually project segments of far more than 17 views. Thus the resolution of the system is not actually limited by the number of subprojectors assembled into the holoform light engine. There is still a benefit to keep the horizontal angular space parameter 112 ($\Phi_s$) as small as possible but it is not directly a limitation of the system. Failure mechanisms can include gaps in the image or loss of 3D perception in specific viewing positions. These failure mechanisms can also be compensated by increasing the imager resolution or reducing the projection lens field of view.

Figure 2:
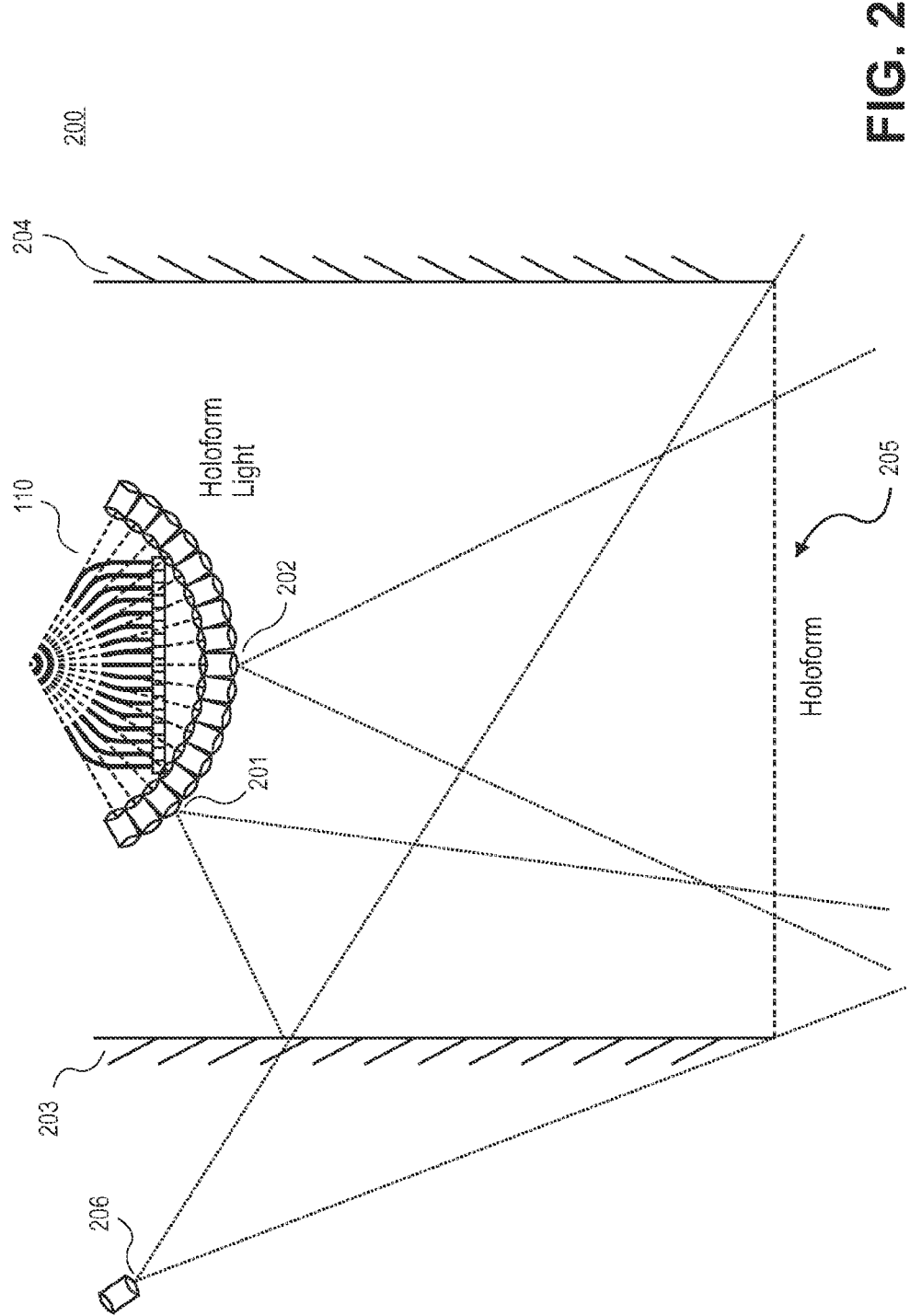
FIG. 2 shows a diagram of an exemplary embodiment of a system comprising a holoform light engine and a mirror arrangement that increases a field of view.

FIG. 2 shows a diagram 200 of an exemplary embodiment of a system comprising a holoform light engine and a mirror arrangement that increases a field of view of the projected 3D image. A system 200 comprises a holoform light engine 110, a mirror arrangement including a mirror 203 and a mirror 204. In an embodiment, an angular distribution of projected images on a holoform screen is insufficient for a holoform projection system. The projectors themselves need to project on the screen from a wide range on angles and positions for a large field of view. Given an angular distribution this is best accomplished by using mirrors, such as mirrors 203 and 204. The reflection from the mirrors increases the field of view by effectively adding more views, such as a view 206 to existing views, such as view 201 and a view 202 from positions outside of the enclosure, as shown in FIG. 2. In one embodiment, mirrors 203 and 204 are substantially parallel mirrors. In one embodiment, mirrors 203 and 204 are curved. In one embodiment, mirrors 203 and 204 are part of a cylinder mirror.

Figure 3:
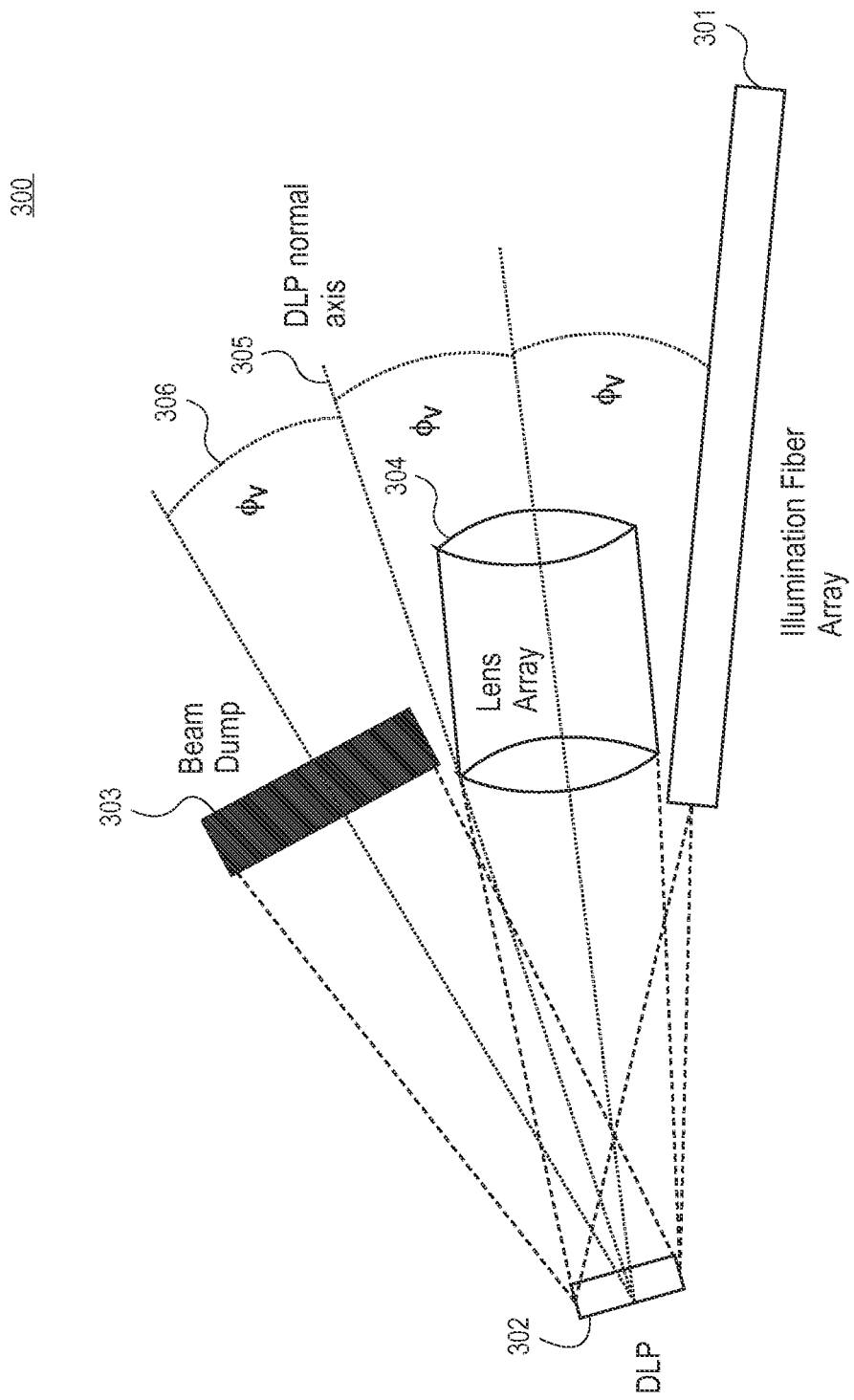
FIG. 3 shows a schematic representation of a side view of an exemplary embodiment of a holoform light engine.

FIG. 3 shows a schematic representation of a side view 300 of an exemplary embodiment of a holoform light engine. The engine includes an illumination fiber array 301, an imager 302, a beam dump 303, and a lens array 304. In one embodiment, the engine represents a portion of the holoform light engine 110 depicted in FIG. 1. In one embodiment, the imager 302 is a DLP imager. In another embodiment, the imager of the holoform light engine is a liquid crystal on silicon (LCOS) imager (not shown). In the system using a LCOS imager technology there is no dump beam to be accommodated but the fundamental speeds of LCOS devices are presently too slow to generate multiple images into many subprojectors. The DLP imager has sufficient speed, but the dump beam (reflection from dark pixels or the negative image) cannot be accommodated in the horizontal plane as it is fully occupied by optics necessary to generate the many views needed to be directed at the holoform screen. Thus the DLP imager 302 needs to dump the negative image information into the vertical plane into a beam dump 303, as shown in FIG. 3.

In an embodiment, the parameter $\Phi_v$ is a full tilt of the DLP pixel mirror. This effectively guarantees that the vertical image has been fully separated before the adjacent horizontal images regardless of a horizontal angular space $\Phi_s$. In the interest of keeping $\Phi_s$ as small as possible this becomes less important and it is found that the existing DLP imagers can be accommodated except those that dump the negative image in the horizontal plane.

Figure 4:
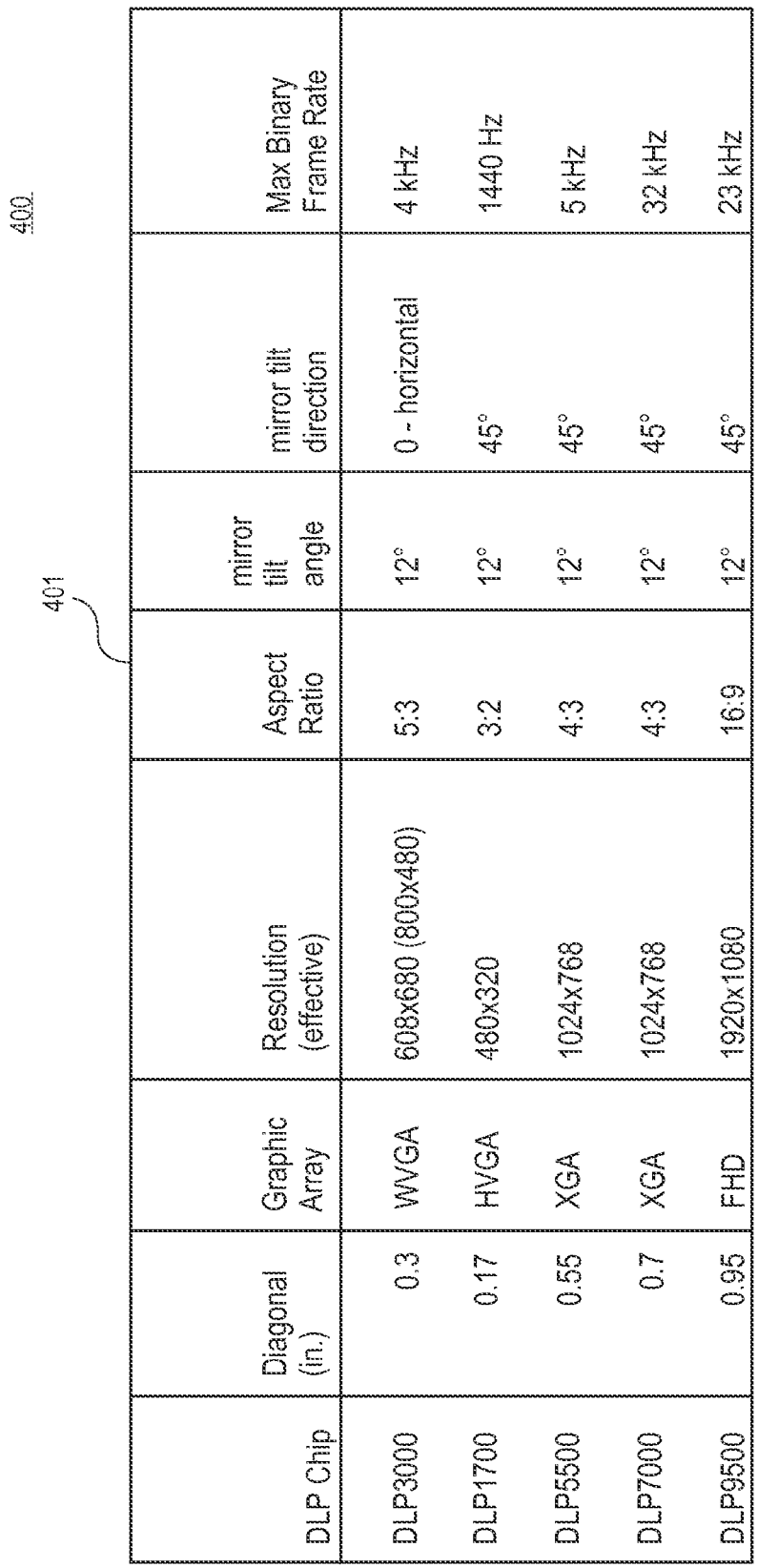
FIG. 4 is a view of a Table 1 showing DLP imagers for an exemplary embodiment of a holoform light engine.

FIG. 4 is a view 400 of a Table 1 showing the DLP imagers that are commercially available today for an exemplary embodiment of a holoform light engine. In an embodiment, not all commercially available DLP imagers have sufficient speed to support 20+ sub-projectors on a single device. Further limitations may include the mirror tilt direction. Mirror hinges are typically connected to the pixel corners and therefore the new diamond device, DLP3000, may be a good choice. This device is not acceptable for this application because the pixel mirrors tilt horizontally. In all other devices the mirrors tilt at a 45 degree angle to the horizontal and vertical. While this is not ideal it can work for all subprojector designs which occupy a horizontal angular space ($\Phi_s$) of 6 degrees or less, as long as the vertical size of the imager is smaller than the horizontal dimension. If a smaller angular space is chosen one needs to be careful to ensure that the negative and positive image will separate in, at least, the same distance that the horizontal beams of adjacent views will separate.

Table 1 also shows the number of frames which can be addressed on each imager as a function of time. The DLP7000 is capable of 32,000 frame updates each second. Such a device could support 22 full color (24 bit) views on a single imager. The most common chroma subsampling, widely used by many high end digital video formats, (4:2:2) reduces both red and blue images to 4 bits each as it uses the same color for two adjacent pixels at different brightness. This results in the possibility of addressing as many as 33 horizontal subprojectors with one imager.

While the DLP7000 imager has a sufficient speed for the system, there may be a problem with the dimensions of this imager. This imager has a horizontal dimension of about 14.2 mm which results in significant restrictions of a horizontal view space and illumination angular extent. In the exemplary 17 subprojector system depicted in FIG. 1 where each view occupies an angular space of 6 degrees, using an illumination angular extent of only 2 degrees requires a distance of about 40 cm to separate adjacent views. This can result in low magnifications and therefore limited field of view in the 3D image space.

Figure 5:
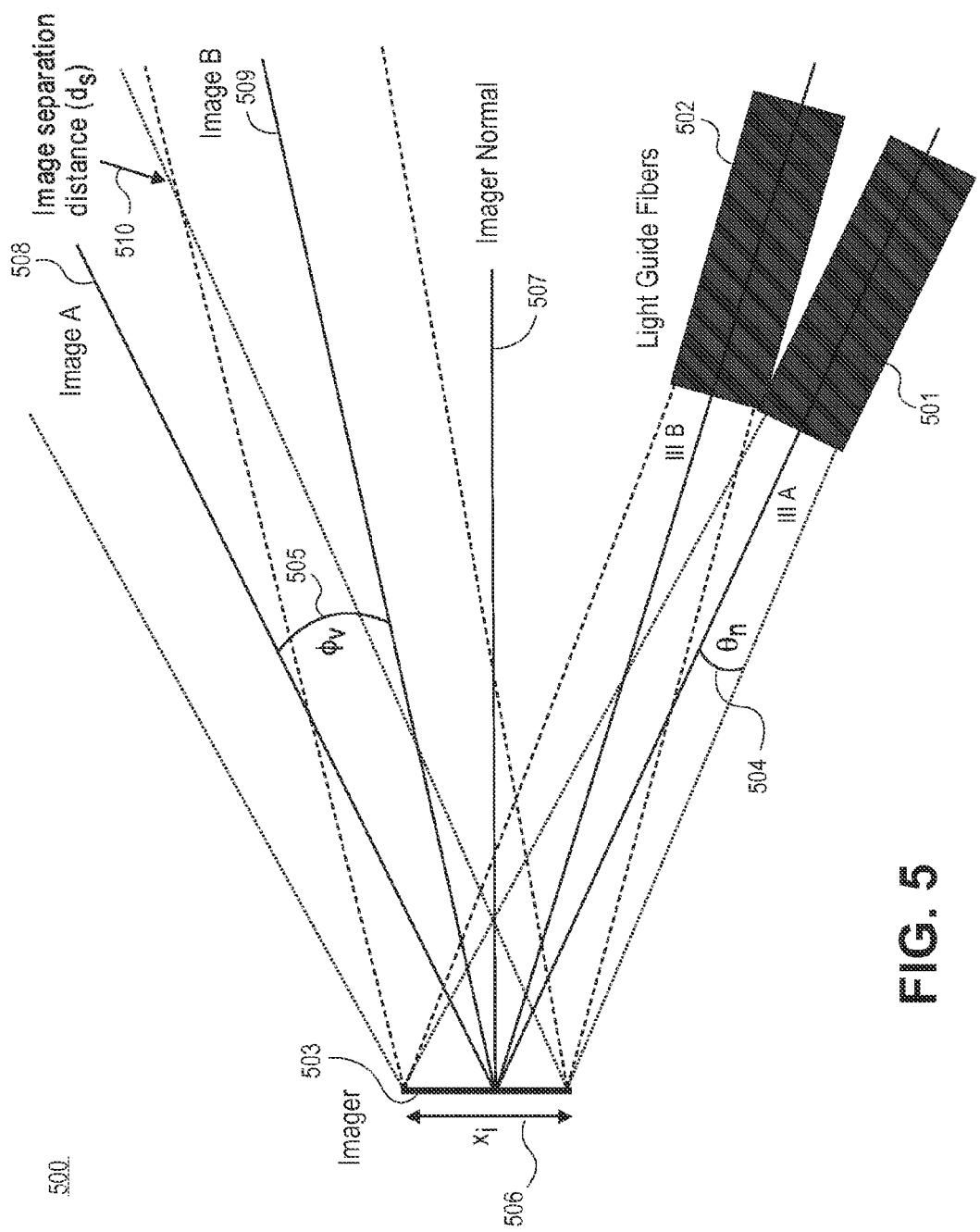
FIG. 5 shows a schematic representation of a top view of an exemplary embodiment of a portion of a holoform light engine indicating a separation distance for two adjacent horizontal subprojections.

FIG. 5 shows a schematic representation of a top view 500 of an exemplary embodiment of a portion of a holoform light engine indicating a separation distance for two adjacent horizontal subprojections. The engine includes light guide fibers, such as light guide fibers 501 and 502 that direct illuminating light to an imager 503 having an imager normal axis 507. Imager 506 has a dimension $X_j$ 506. Imager 503 directs light from the light guide fibers 501 and 502 to form an image A 508 and an image B 509. In one embodiment, the engine represents a portion of the holoform light engine 110 depicted in FIG. 1. An image separation distance parameter $d_s$ indicates the minimum spacing required to separate the views to form images 508 and 509, and is also the minimum back focal length required for each projection lens. In reality this distance may need to be as much a twice this dimension due to physical/mechanical constraints of the projection lenses themselves. A lens of this design will require shifting significant cost to the lens array to accommodate this very long back focal lengths.

Reducing the diagonal dimension (e.g., dimension 506) of the imager to 0.3 inch can be a huge benefit to this system. For the same illumination and view dimension the parameter $d_s$ now falls to 19 cm. This is a far more manageable lens design. Further reduction of the illumination angular extent from 2 to 1.5 degrees reduces $d_s$ to 13 cm (5 inches). This again is a much more appropriate design parameter for projection lenses. In an embodiment, in a manufacturable holoform 3D system the input lens array (the field lens element) can be designed as a single freeform optic. This can significantly reduce the additional space required between each view that would be necessary to accommodate round lenses and the associated mechanics for positioning.

Further Optical Considerations of the Holoform Light Engine

The pertinent parameters are shown in the FIGS. 1-5. As described herein, an important limitation is the separation of adjacent images from each subprojector before reaching the projector lens array. This is expressed in an equation as follows:

$$d_s = x_i / \sin(\Phi_s - 2\Theta_n)$$

where $x_i$ is a horizontal dimension of the imager and $\Theta_n$ is an angular extent of the illumination. This is identical for vertical image separation where the x imager dimension is replaced by the vertical (y) dimension. Given that x is the larger dimension vertical image separation can commonly occur in a shorter space. Note that $d_s$ approaches infinity in the limit that $\Phi_s = 2\Theta_n$. Thus another limitation on $\Phi_s$ is as follows:

$$\Phi_s > 2\Theta_n$$

This restriction effectively limits the illumination source to a laser diode for small $\Theta_n$. Both parameters further affect the design of the projection lens, the dimensions of the light guide and imager, as well as $r_i$ and $r_L$. Furthermore, the angular space of each subprojector ($\Phi_s$) depends on the projection lens dimensions and the optical speed of the lens (magnification/throw) as well as the back focal length. A long back focal length will allow more lenses to be fit in the plane of the lens array, and therefore more subprojection systems which can provide more views, but it can also adversely affect lens dimensions and lens optical speed.

The Illuminator

Figure 6:
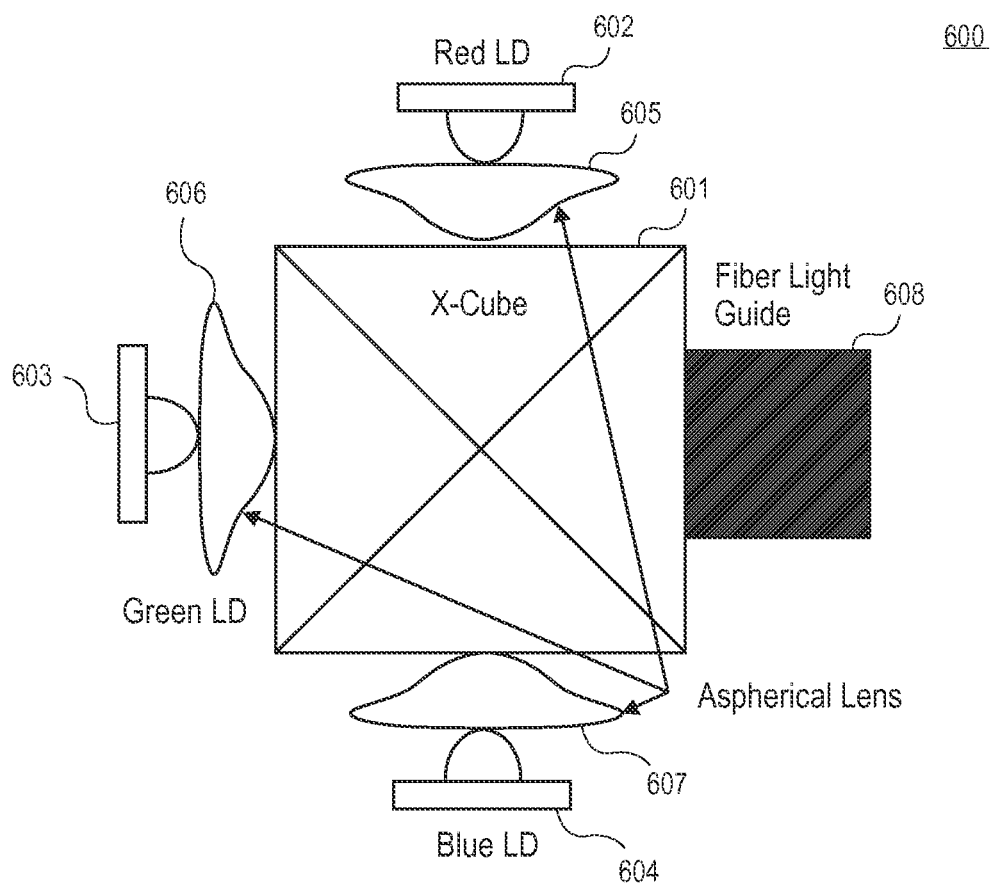
FIG. 6 shows a diagram illustrating an exemplary embodiment of an illuminator used in a holoform light engine.

FIG. 6 shows a diagram illustrating an exemplary embodiment of an illuminator 600 used in a holoform light engine. The illuminator 600 can represent one of the illuminators depicted in FIG. 1. The illuminator 600 comprises an X-cube 601 and light sources 602, 603, and 604 that supply light through corresponding lenses, such as aspherical lenses 605, 606, and 607 and through X-cube 601 to a fiber light guide 608.

As described herein, the restriction of the illumination angular extent may require the use laser diodes for illumination. The reduced wavelength dispersion of these devices allows for better beam shaping to more efficiently illuminate the fiber (light pipe) at the appropriate angular extent. The use of the diode laser (LD) has no additional constraints over the use of any LED. The efficiency, switching speed, and overdrive capacity are excellent and have all the same physical constraints as standard semiconductor LEDs. An effective and simple design for the illuminator is shown in FIG. 4. A simple aspherical lens at the output of each laser source (e.g., LED, or laser diode) can effectively collimate the beam and an x-cube can combine the illumination of each LD to illuminate the fiber light pipe. The x-cube is used for illumination purposes and therefore need not be of the same specification as those used to combine images in many 3 panel projection systems.

In an embodiment, a light guide fiber can be used to improve collection and shape the illumination. With a small angular extent of the illumination the output face of the fiber can be only slightly smaller than the imager itself, thus improving light collection. The fiber can also be tapered to better shape the output. A small increase in dimension results in better collimation. Furthermore, the fiber can act as an integrator resulting in a very uniform illumination. This illumination light pipe fiber can also be used to accommodate different imager aspect ratios and dimensions. A round input can be used with a rectangular output with the same aspect ratio as the imager. While this changes the angular extent of the illumination it can further improve the illumination uniformity and illumination area resulting in an additional gain for the illumination lost to the angular extent constraint.

Image Distortion

The images produced by the subprojectors at the relatively oblique angles may result in distortion. These images may be wider than those projected at an angle relatively normal to the imager. This will not be a problem based on the fact that the projected information is not actually an image but an assembly of stripes (image segments) that make up multiple views. Adjusting any distortion in each segment will actually be simpler than adjusting a full image distorted by oblique reflection. Regardless, this can be most easily managed at the imager and only requires that the width of each segment being imaged is not equal to one pixel.

In another embodiment, an adjustment in the manufacturing of the screen is made. Because holoform screens are produced as regular holograms, there is no requirement that the horizontal diffusion remain uniform for all illumination angles. A larger diffusion of oblique angle rays can be made equal to the size correction for the segment resulting in a more uniform image over the surface. This can also be used to an advantage of the system. There can be many advantages to such a design. For example, this can be used to further increase the field of view or even "fill" large angular extents with what amounts to 2D images. This is a significant advantage for applications like video walls where limited field of view will result as blank portions of the screens that are not designed to project into those angles.

Holoform Brightness Gain

A limitation of this design may be illuminating a small angular extent while delivering sufficient brightness to the image, especially in a video wall application. This limitation, in conjunction with the extensive time multiplexing required by the holoform system may result in such significant loss of light that it cannot be compensated by larger, more powerful, illuminators.

An advantage to brightness in the holoform system is the screen gain due to limited horizontal diffusion. A typical 2D screen projects most of its light (50%) into a horizontal angle of 54 degrees. This still results in limited brightness at larger angles. Still each projector used in a holoform system described herein may appear as much as 20 times brighter than the same projector used in a 2D application.

Another advantage is that multiple subprojectors are required to build up each view. In the example above 2×17 projectors are used to project into the same angular extent. This results in an additional gain of 34× if all projectors are assumed to have the same 2D brightness. These gains may be sufficient to offset the losses due to small angular extent directed to each illumination fiber and extensive time multiplexing.

Thus, with proper design a high resolution, reduced cost, 3D image can be produced using the embodiments of the light engine having a very large field of view as described herein. Proper management of the optical design tradeoffs is used to realize any specific application, e.g., a 3D digital signage video wall. The angular distribution design as described herein is a key to realizing the large field of view. Furthermore, the problem of image blurring due to moving optics is eliminated.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A projection apparatus, comprising:
   a projector, which includes an imager; and
   an angular array of illumination optics coupled to the imager, wherein a first illumination optics element of the angular array is to supply a light to the imager at a first angle and a second illumination optics element of the angular array is to supply the light to the imager at a second angle other than the first angle to create a plurality of views for an image.

2. The projection apparatus of claim 1, further comprising:
   an array of projection optics coupled to the imager, wherein the angular array of illumination optics is fixed spatially relative to the projector.

3. The projection apparatus of claim 1, further comprising:
   a light source coupled to the angular array.

4. A holoform projection display system, comprising:
   a plurality of illuminators;
   an angular array of light guides coupled to the illuminators;
   an imager coupled to the angular array of light guides wherein a first light guide of the angular array is to supply a light to the imager at a first angle and a second light guide of the angular array is to supply the light to the imager at a second angle other than the first angle; and
   an array of projection lenses coupled to the imager.

5. The holoform projection display system of claim 4, wherein at least one of the illuminators comprises:
   a light emitting diode.

6. The holoform projection display system of claim 4, wherein at least one of the illuminators comprises:
   a laser diode.

7. The holoform projection display system of claim 4, further comprising:
   a mirror arrangement coupled to the array of projection lenses to increase a field of view.

8. A method to provide a 3D projection display, comprising: supplying a light at a plurality of angles to an imager using an angular array of illumination optics to create an image, wherein a first illumination optics element of the angular array is to supply the light to the imager at a first angle and a second illumination optics element of the angular array is to supply the light to the imager at a second angle other than the first angle; and
   directing the light by a projector to an array of lenses.

9. The method of claim 8, further comprising:
   time multiplexing the supplied light.

10. The method of claim 8, wherein the lenses have an arrangement determined by the plurality of angles.

\* \* \* \* \*